(12) United States Patent
Neal

(10) Patent No.: US 9,695,349 B1
(45) Date of Patent: Jul. 4, 2017

(54) PHASE CHANGE MATERIAL COMPOSITION AND METHOD OF FABRICATING AND PACKAGING THE SAME

(71) Applicant: Neal Energy Management, LLC, Boulder City, NV (US)

(72) Inventor: Orville Thomas Neal, Boulder City, NV (US)

(73) Assignee: Neal Energy Management, LLC, Boulder City, NV (US)

( * ) Notice: Subject to any disclaimer, the term of this patent is extended or adjusted under 35 U.S.C. 154(b) by 0 days.

(21) Appl. No.: 15/092,438

(22) Filed: Apr. 6, 2016

(51) Int. Cl.
C09K 5/06 (2006.01)
B65B 7/02 (2006.01)
B65B 63/08 (2006.01)

(52) U.S. Cl.
CPC ............. C09K 5/063 (2013.01); B65B 7/02 (2013.01); B65B 63/08 (2013.01)

(58) Field of Classification Search
None
See application file for complete search history.

(56) References Cited

U.S. PATENT DOCUMENTS

| 4,613,444 A * | 9/1986 | Lane | C09K 5/063 |
| | | | 126/400 |
| 2009/0011171 A1 * | 1/2009 | Alderman | C08K 3/0008 |
| | | | 428/72 |

* cited by examiner

Primary Examiner — Necholus Ogden, Jr.
(74) Attorney, Agent, or Firm — FisherBroyles, LLP; Rob L. Phillips

(57) ABSTRACT

A unique phase change material composition and method of maintaining pre-established environmental conditions and safeguards during the manufacturing process. A fabrication method and parameters which result in a more efficient and safe packaged phase change material. A microspherical form of Perlite is the chosen phase change material. The microspherical form of Perlite is vacuum packed in such a manner to exclude water and moisture as well as utilizing a sealing surface of sufficient width to maintain a vapor barrier at the sealed edges. Besides absorption and release of heat, the packaged phase change material may be used as a fire preventive article in residential and commercial properties.

7 Claims, 5 Drawing Sheets

PHASE CHANGE MATERIAL COMPOSITION AND METHOD OF FABRICATING AND PACKAGING THE SAME

FIELD OF THE INVENTION

The embodiments of the present invention relate to packaged phase change material composition and method of fabricating the same rendering the packaged phase change material composition efficient and safe.

BACKGROUND

Phase change materials are able to store heat energy. Phase change materials are chemical compounds that use latent heat properties of a material to store heat energy as chemical energy. Latent heat is a measure of the energy necessary to change a material from one state to another. Phase change materials store heat by melting or otherwise changing from a solid to a liquid and release heat by freezing or otherwise changing from a liquid to a solid.

Phase change materials have long been seen as the answer to reducing energy loads. Unfortunately, the advancement of phase change materials has not materialized. There are many reasons, including inefficiencies and safety, for the lack of advancement of phase change materials.

Thus, it would be advantageous to develop a more efficient and safe packaged phase change material composition for use with residential and commercial buildings.

SUMMARY

Embodiments of the present invention relate to fabrication methods and parameters which result in a more efficient and safe packaged phase change material compositions. In one embodiment, a microspherical form of Perlite is used as the phase change material. In another embodiment, the microspherical form of Perlite is vacuum packed in such a manner to exclude water and moisture while utilizing a sealing surface of sufficient width/depth to maintain a vapor barrier at the sealed edges. In another embodiment, the packaged phase change material composition may be used as a fire preventive article in residential and commercial buildings.

Another embodiment of the present invention relates to a phase change material composition and method of manufacturing the same. The method comprises utilizing a unique composition and maintaining pre-established environmental conditions and safeguards during the manufacturing process.

Other variations, embodiments and features of the present invention will become evident from the following detailed description, drawings and claims.

DETAILED DESCRIPTION

Figure 1A:
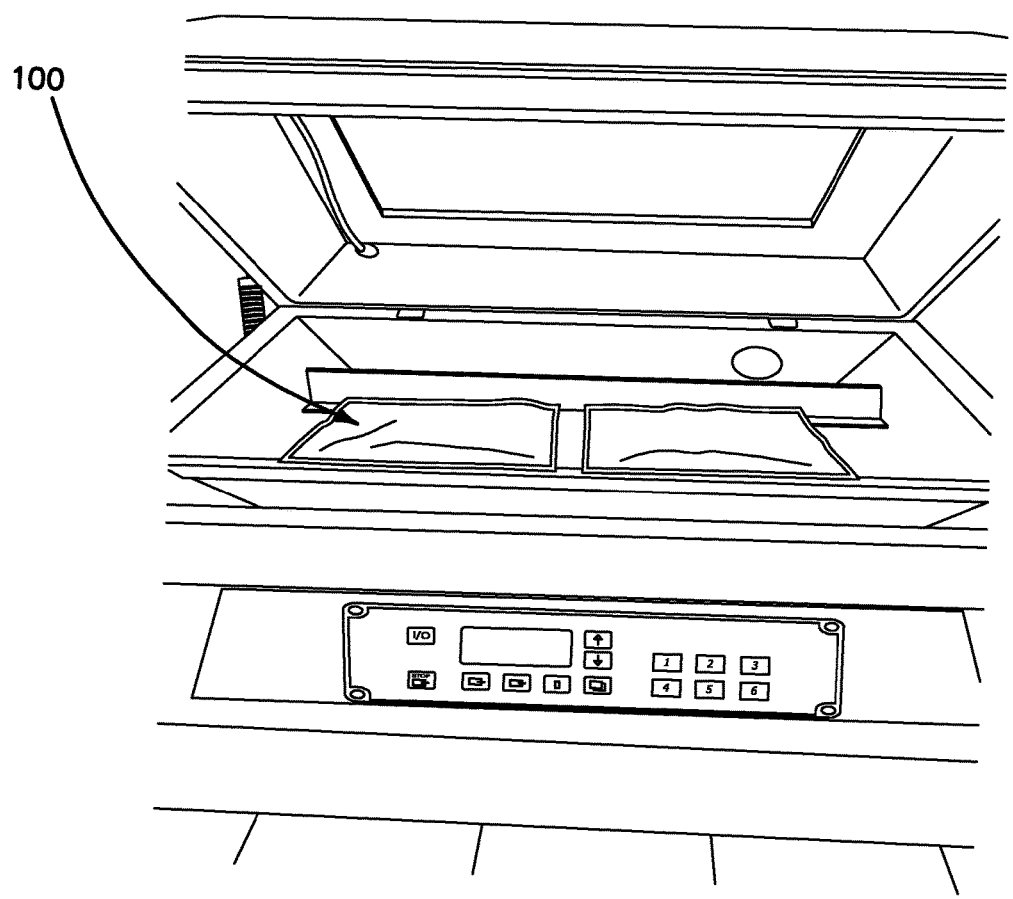
FIG. 1A illustrates a phase change pouch of the type used to package phase change material according to the embodiments of the present invention.

For the purposes of promoting an understanding of the principles in accordance with the embodiments of the present invention, reference will now be made to the embodiments illustrated in the drawings and specific language will be used to describe the same. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Phase change material compositions come in many forms but many are not effective at absorbing heat and discharging heat as desired. The embodiments of the present invention are designed to render the phase change material composition more efficient and effective for the purposes detailed herein.

Table 1 details an exemplary ingredient list for a first phase change material composition according to the embodiments of the present invention.

TABLE 1

| Material | Weight Percentage | Purity Level |
|---|---|---|
| Calcium Chloride ($CaCl_2$) | 40.08% | 94%-97% |
| Potassium Chloride (KCl) | 4.22% | >99% |
| Strontium Chloride ($SrCl_2$) | 0.86% | >99% |
| Sodium Chloride ($NaCl_2$) | 1.46% | >99% |
| Barium Sulfate ($BaSO_4$) | 0.09% | >99% |
| Water ($H_2O$) | 39.29% | purified |
| Perlite | 14.00% | |

While Table 1 details a specific phase change material composition, those skilled in the art will recognize that the weight percentages of the ingredients may fluctuate without significantly impacting the effectiveness of the phase change material composition. For example, in other embodiments, the Calcium Chloride weight percentage may range from about 30% to 50%, the Potassium Chloride weight percentage may range from about 3% to 6%, the Strontium Chloride weight percentage may range from about 0.0% to 1.5%, the Sodium Chloride weight percentage may range from about 0.0% to 2%, the Barium Sulfate weight percentage may range from about 0.0% to 1.0% and the Perlite weight percentage may range from about 10% to 20%. Other salts may be used as well. U.S. Pat. Nos. 4,613,444 and 4,412,931 to Lane which are incorporated herein by reference disclose many salts that may be suitable for the embodiments of the present invention.

In one embodiment, as set in Table 1, the phase change material composition ingredients have threshold purity levels further rendering the phase change material composition more effective for the purposes described herein. The phase change material composition manufactured according to Table 1 and the manufacturing procedures set forth below has a transition temperature of approximately 80° F. with a latent heat of fusion of 70-80 Btu/lbm.

In one embodiment, a microspherical form of Perlite is the phase change material in the phase change material composition. Perlite is a lightweight filler material formed from expanded volcanic ore. In one embodiment, the microspherical form of Perlite is promoted and sold under the name "Sil-Cell Sil-42." Perlite known by Sil-Cell Sil-42 prevents incongruent melting, provides nucleation sites for formation of the hexahydrate form of $CaCl_2$ during the freezing phase, and provides sufficient thickening of the packaged phase change material when in the liquid phase to prevent sagging under gravity when used in a vertical orientation. Sil-Cell Sil-42 is supplied by Silbrico Corporation located in Hodgkins, Ill.

Figure 1B:
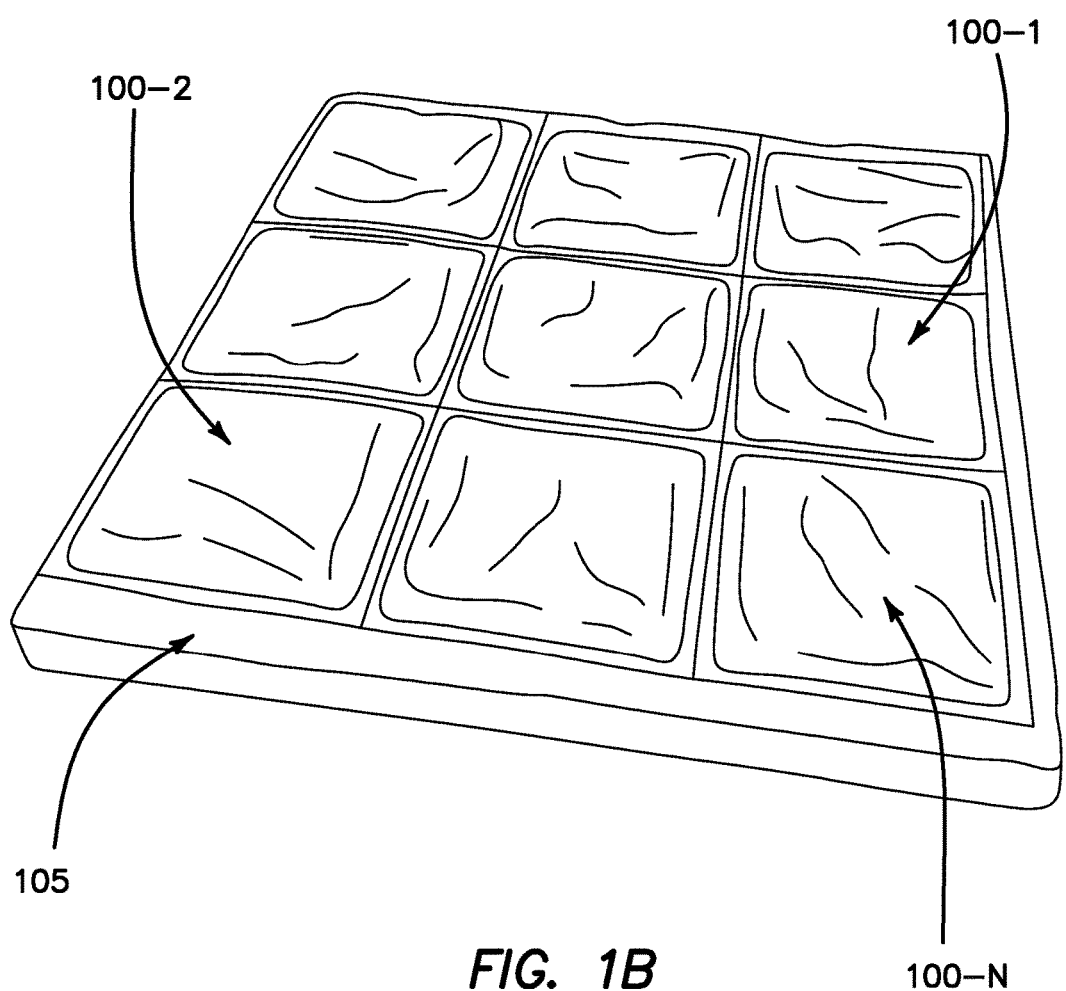
FIG. 1B illustrates a series of pouches of FIG. 1A filled with a phase change material composition joined to a substrate to form a panel or tile according to the embodiments of the present invention.

Applicant has determined that the introduction of water into the phase change material composition packaging negatively impacts the integrity of congruent melting and freezing in the phase change material composition. Maintaining the integrity of congruent melting and freezing in the phase change material composition is therefore an objective of the embodiments of the present invention. Accordingly, one embodiment of the present invention utilizes clean seals and seals which act as vapor barriers. In one embodiment, the phase change material composition is sealed in poly-vinyl-foil laminated pouches 100 as shown in FIG. 1A. As shown in FIG. 1B, multiple poly-vinyl-foil laminated pouches 100-1 through 100-N may be joined to a substrate (e.g., insulation tile) to form a panel or tile 110 of poly-vinyl-foil laminated pouches filled with phase change material composition. To maintain the effectiveness of the poly-vinyl-foil laminated pouches 100-1 through 100-N, the seals should 105 be clean and deep or wide enough to form a vapor barrier. In one embodiment, the seals 105 of the poly-vinyl-foil laminated pouches 100-1 through 100-N are at least ¼" deep from outer edge to the phase change material composition in the poly-vinyl-foil laminated pouches 100-1 through 100-N to form a vapor barrier.

In one embodiment, the thickness of the phase change material composition in the poly-vinyl-foil laminated pouches 100-1 through 100-N should be a minimum of 1.25 cm thick. In one embodiment, 6"×8" poly-vinyl-foil laminated pouches are used but those skilled in the art will recognize that poly-vinyl-foil laminated pouches of other sizes may be used.

The panels or tiles 110 may then be used in residential or commercial buildings to maintain consistent temperatures and reduce energy loads as disclosed in U.S. Pat. Nos. 7,735,327 and 7,797,950 which are both incorporated herein for any and all purposes.

Figure 2:
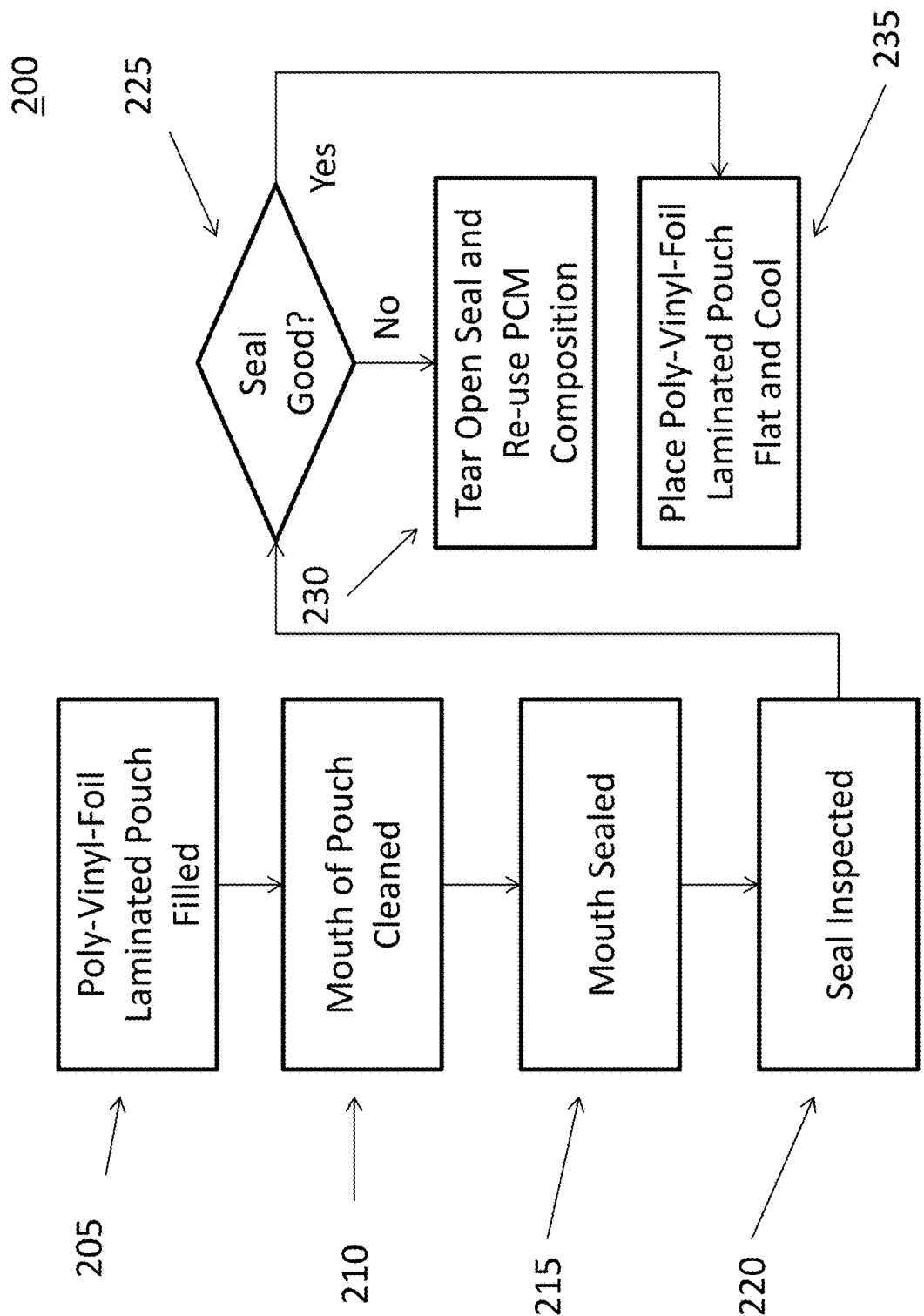
FIG. 2 illustrates a flow chart detailing a phase change material composition packaging process according to the embodiments of the present invention.

FIG. 2 shows a flow chart 200 detailing a phase change material packaging process according to the embodiments of the present invention. At 205, poly-vinyl-foil laminated pouches are filled with phase change material composition. In one embodiment, a hopper with a pneumatic filling piston is used to fill the poly-vinyl-foil laminated pouches. In one embodiment, each 6"×8" poly-vinyl-foil laminated pouch contains about 250 grams of phase change material composition. Smaller and larger pouches would contain less or more phase change material composition, respectively. At 210, a mouth of the poly-vinyl-foil laminated pouch is cleaned with a cloth if needed. The mouth of the poly-vinyl-foil laminated pouch should be clean from phase change material composition and other contaminants such that a good seal is formed. At 215, vacuum chambers having heat sealing bars are utilized to seal the poly-vinyl-foil laminated pouches filled with phase change material composition. In one embodiment, $3/8^{th}$ of an inch of the poly-vinyl-foil laminated pouch should extend beyond a sealing strip to ensure the seal is at least ¼" deep or wide. At 220, the seal is inspected for flatness and straightness. If any part of the seal is folded or improperly aligned, the poly-vinyl-foil laminated pouch may be ineffective. At 225, seal inspected to determine if any phase change material composition has made it past the seal during the sealing process. If not, at 230, the poly-vinyl-foil laminated pouch is torn open so that the phase change material composition is re-used. If the seal is good, at 235, the sealed poly-vinyl-foil laminated pouches are placed flat on a cooling rack to cool and solidify.

Figure 3:
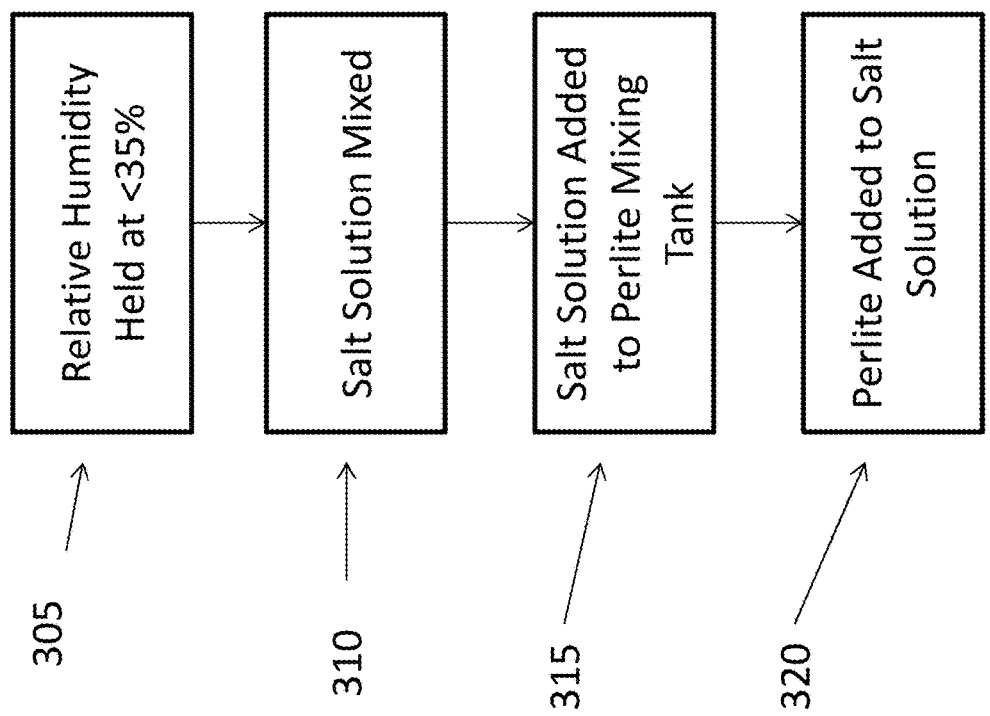
FIG. 3 illustrates a flow chart detailing a phase change material composition manufacturing process according to embodiments of the present invention.

FIG. 3 shows a flow chart 300 detailing a phase change material composition manufacturing process according to the embodiments of the present invention. At 305, relative humidity in manufacturing facility maintained at <35%. At 310, a salt solution is manufactured. At 315, the salt solution is added to a Perlite mixing tank. At 320, a proper mass of Perlite is gradually added to the salt solution and mixed at low speed with the temperature maintained at 100° F.-110° F.

Figure 4:
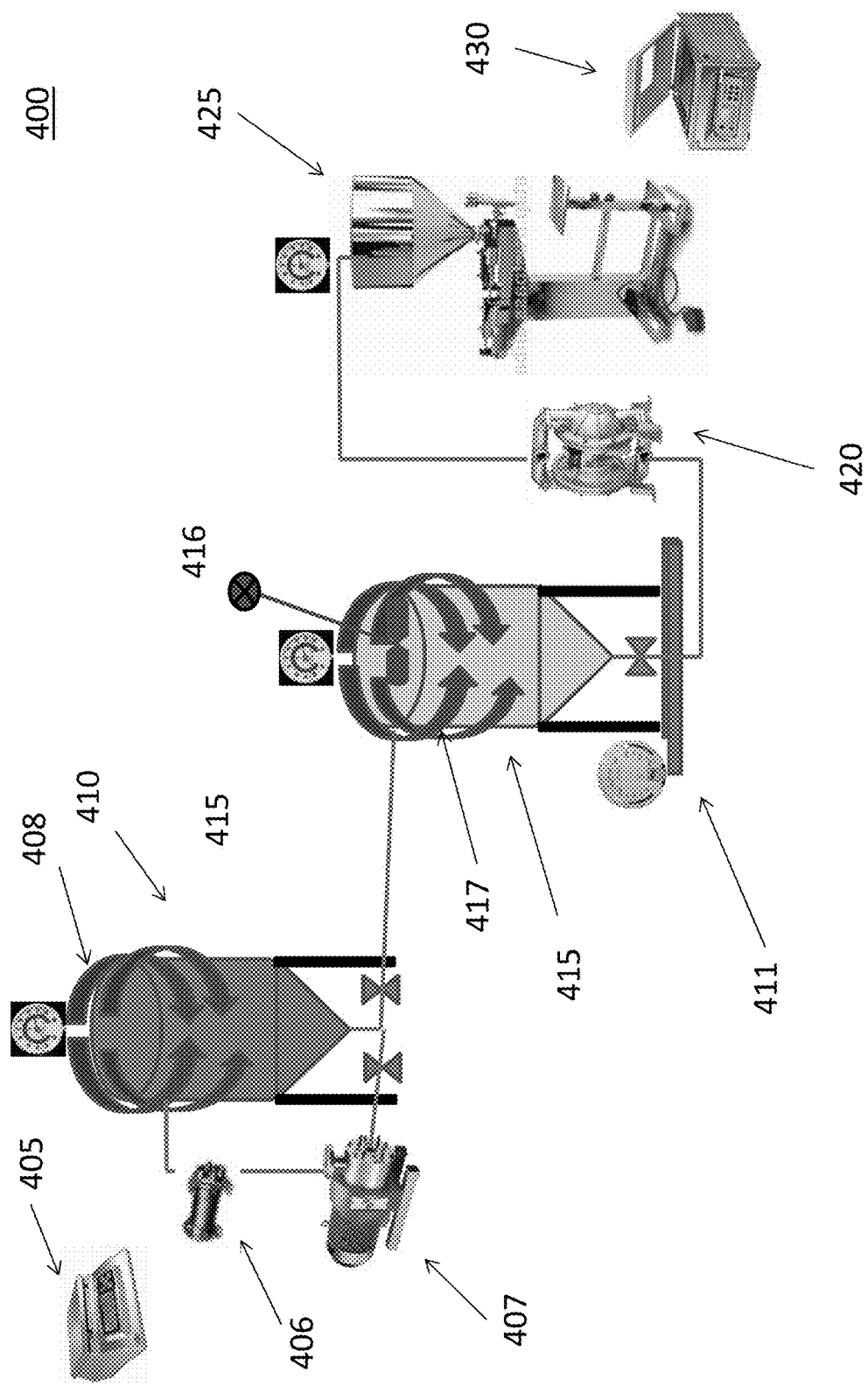
FIG. 4 illustrates a block diagram of a system for fabricating and packaging a phase change material composition according to embodiments of the present invention.

FIG. 4 shows a block diagram 400 of a system for fabricating and packaging phase change material composition. A scale 405 is used to weigh salts for manufacturing a salt solution in accordance with the percentages and purity levels set forth in Table 1 for example. A salt solution mixing tank 410 is used to mix a salt solution. In one embodiment, the salt solution mixing tank 410 is a 30 gallon cone-bottom tank. Mixing of Calcium Chloride and water is an exothermic reaction. The rapid addition of Calcium Chloride to water in an uncontrolled temperature environment can lead to temperature rise in excess of 100° F. Calcium Chloride must be added in a controlled manner with active cooling of the mixture. This is achieved via a shell and tube heat exchanger 406 circulating chilled water to remove heat from the salt mixture in the salt solution mixing tank 410. The water-Calcium Chloride mixture is prone to freezing below 80° F., so once the Calcium Chloride addition is complete, the system temperature must be held between 100° F.-110° F. A resistive heating blanket 408 around the salt solution mixing tank 410 is effective at maintaining system temperature within acceptable limits. In one embodiment, Calcium Chloride is added to water and run through the chiller to cool, then remaining salts are added with heat to prevent freezing. After the Calcium Chloride and water are mixed, the other salts may be added.

In one embodiment, recirculation is utilized to create an evenly dissolved and mixed salt solution. The granular nature of the salts poses risks of clogging, slow mixing and imperfect dissolving. A mixer 409 is essential to quick and thorough dissolving of salts. In one embodiment, the mixer 409 is a Silverson High-Shear Inline Mixer/Pump having a special rotor-stator workhead configured to apply a shearing action to a fluid being pumped—helping to mix and break down any suspended solids. Using the mixer/pump generates both a mixing and circulating action.

A Perlite mixing tank 415 is in communication with the salt solution mixing tank 410 via a gravity feed or pump feed. In one embodiment, the Perlite mixing tank 415 is a 60 gallon cone bottom tank. The contents of the salt tank, once mixed, are pumped or drained into the clean, dry Perlite mixing tank 415 prior to addition of the Perlite. As referenced herein, to create the most effective phase change material, the Perlite and salt solution must be in a specific ratio. For every kilogram of the salt solution, a specific mass of Perlite must be added. Once the proper amount of Perlite is calculated, the Perlite may be added in two ways. First, the needed mass of perlite and the known mass of the salt solution can be added to find the total weight of the final product. Perlite can then be added to the salt solution, and the mixture may be constantly measured until the target mass is reached. Second, in an alternative manner, the needed mass of Perlite can be weighed in a single container. The measured amount of Perlite can then be added to the salt solution. In one embodiment, the Perlite mixing tank 415 rests on a scale 411 to permit proper weights of salt solution and Perlite mass. A heat blanket 417 may be used to maintain desired temperatures in the Perlite mixing tank 415.

The Perlite should be added gradually, at a temperature of 100° F.-110° F., to prevent large piles/groupings of Perlite on a surface of the mixture.

Perlite is a friable material, which when expanded from volcanic ore, forms a "glass" bubble. During the mixing process, the Perlite may be grounded or sheared. Accordingly, Perlite should be mixed at lower speeds with less aggressive mixing methods. In one embodiment, the Perlite mixing tank 415 incorporate a ribbon mixer 416. A gentle churning or folding action is ideal.

A hopper 425 receives phase change material from the Perlite mixing tank 415 by means of a diaphragm pump 420. Since Perlite is much lighter than the salt solution and tends to separate to the surface of the mixture, the Perlite tank 415 and the hopper 425 should be constantly mixed, or regularly and consistently mixed. A vacuum-sealing machine 430 is utilized to thermally seal the phase change material composition the poly-vinyl-foil laminated pouches 100-1 through 100-N of the type shown in FIGS. 1A and 1B.

The filling and sealing of the poly-vinyl-foil laminated pouches 100-1 through 100-N then occurs as described above relative to FIGS. 2 and 3. In one embodiment, the phase change material composition comprising the salt solution and Perlite is manually dropped into the poly-vinyl-foil pouches 100-1 through 100-N via hopper 425. The process may also be automated.

Although the invention has been described in detail with reference to several embodiments, additional variations and modifications exist within the scope and spirit of the invention as described and defined in the following claims.

I claim:

1. A phase change material composition consisting of:
about 30%-40% by weight of Calcium Chloride;
about 3.0% to 6% by weight of Potassium Chloride;
about 30% to 50% by weight of water; and
about 10% to 20% by weight of Perlite, said Perlite in a microspherical form.

2. The phase change material composition of claim 1 further comprising 0.01% to 0.3% by weight of Barium Sulfate, 0.1% to 1.5% by weight of Strontium Chloride and/or 0.1% to 2.0% by weight of Sodium Chloride.

3. The phase change material composition of claim 1 wherein a purity level of said Calcium Chloride is 94%-97%.

4. The phase change material composition of claim 2 wherein a purity level of said Potassium Chloride, Strontium Chloride, Sodium Chloride and/or Barium Sulfate is >99%.

5. A phase change material composition consisting of:
about 40.8% by weight of Calcium Chloride;
about 4.22% by weight of Potassium Chloride;
about 0.86% by weight of Strontium Chloride;
about 1.46% by weight of Sodium Chloride;
about 0.09% of Barium Sulfate;
about 39.29% by weight of water; and
about 14% by weight of Perlite, said Perlite in a microspherical form.

6. The phase change material composition of claim 5 wherein a purity level of said Calcium Chloride is 94%-97%.

7. The phase change material composition of claim 5 wherein a purity level of said Potassium Chloride, Strontium Chloride, Sodium Chloride and/or Barium Sulfate is >99%.

* * * * *